(12) United States Patent
Simell et al.

(10) Patent No.: US 7,455,705 B2
(45) Date of Patent: Nov. 25, 2008

(54) METHOD FOR THE PURIFICATION OF GASIFICATION GAS

(75) Inventors: Pekka Simell, Vantaa (FI); Esa Kurkela, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 10/481,357

(22) PCT Filed: Jun. 20, 2002

(86) PCT No.: PCT/FI02/00548

§ 371 (c)(1),
(2), (4) Date: Jan. 16, 2004

(87) PCT Pub. No.: WO03/000829

PCT Pub. Date: Jan. 3, 2003

(65) Prior Publication Data

US 2004/0208810 A1  Oct. 21, 2004

(30) Foreign Application Priority Data

Jun. 21, 2001  (FI)  ................... 20011327

(51) Int. Cl.
  *C01B 3/24* (2006.01)
  *C01B 3/36* (2006.01)
  *C10J 3/46* (2006.01)
  *C10J 3/54* (2006.01)
  *B01J 7/00* (2006.01)
  *B01J 25/00* (2006.01)
  *B01J 23/00* (2006.01)
  *H01M 8/06* (2006.01)

(52) U.S. Cl. .............. 48/198.3; 48/197 R; 48/61; 502/300; 502/349

(58) Field of Classification Search ........... 48/200–202, 48/204, 209–213, 214 R, 215, 214 A, 198.3, 48/197 R; 423/237, 239.1; 502/349
See application file for complete search history.

(56) References Cited

U.S. PATENT DOCUMENTS

| | | | |
|---|---|---|---|
| 1,727,892 A * | 9/1929 | Moses ............................ | 48/73 |
| 1,844,393 A * | 2/1932 | Jaeger ........................ | 423/358 |
| 3,121,611 A * | 2/1964 | Parker ........................ | 423/579 |
| 4,331,451 A * | 5/1982 | Isogaya et al. ............ | 48/214 A |
| 4,769,224 A | 9/1988 | van Grinsven et al. | |
| 5,906,803 A * | 5/1999 | Leppalahti .................. | 423/237 |
| 2001/0055560 A1* | 12/2001 | Schiodt et al. .............. | 423/655 |
| 2002/0028171 A1* | 3/2002 | Goetsch et al. ............. | 423/237 |

FOREIGN PATENT DOCUMENTS

| | | |
|---|---|---|
| EP | 0 460 738 A1 | 12/1991 |
| EP | 0 700 717 A1 | 3/1996 |

* cited by examiner

*Primary Examiner*—Patrick Ryan
*Assistant Examiner*—Matthew J Merkling
(74) *Attorney, Agent, or Firm*—Knobbe, Martens, Olson & Bear LLP

(57) ABSTRACT

The invention relates to a method for the purification of gasification gas obtained from a carbonaceous material. The purification is carried out by adding oxygen or an oxygen-containing gas to the gasification gas and by contacting the gas mixture with a solid catalyst. According to the invention the catalyst contains at least one zirconium compound, such as zirconium oxide, which is used in particulate form as such or, for example, combined with an inert, honeycomb-structured support. By the purification, ammonia and organic tarry impurities can be removed from the gas simultaneously.

25 Claims, 1 Drawing Sheet

METHOD FOR THE PURIFICATION OF GASIFICATION GAS

This is the U.S. National Phase under 35 U.S.C. § 371 of International Application PCT/FI02/00548, filed Jun. 20, 2002, which claims priority of FI-20011327, filed Jun. 21, 2001 Each of the above applications are incorporated herein by reference in their entirety.

BACKGROUND OF THE INVENTION

The invention relates to a method for the purification of gasification gas obtained from a carbonaceous material, in which method a gas stream made up of gasification gas and oxygen or an oxygen-containing gas added to it is contacted with a solid catalyst. In addition, the invention relates to the use of a catalyst in the purification of gasification gas.

The principal components of a gas obtained by the gasification of a fuel are carbon monoxide, carbon dioxide, methane, hydrogen, water vapor and nitrogen. In addition, the gasification gas typically contains small amounts of ammonia formed from nitrogen compounds in the fuel, as well as tarry organic compounds. The presence of ammonia in the gasification gas constitutes a problem, since in the combustion of the gas it turns into nitrogen oxides (NOx) detrimental to the environment. Tarry impurities also constitute a drawback, for example, when the gas is used for the production of electricity by means of an engine or a turbine or for the production of synthesis gas for the synthesis of methanol. Thus there exists a need to purify the gasification gas of detrimental components before its combustion or other further use.

It is previously known to remove ammonia from gasification gas by the scrubbing of the gas. This, however, involves the drawback of the waste waters formed, and the cooling of the gas is also a disadvantage when the gas is fed from gasification directly to combustion. Ammonia has also been removed by selective catalytic oxidation of the gasification gas, the catalyst used being, for example, aluminum oxide [1,2]. It has been observed that aluminum oxide also purifies gasification gas of tarry components when their amount in the gas is small.

Known catalysts suitable for breaking down the tar present in gasification gas include nickel catalysts and dolomites having an operating temperature of 800-900° C. [3]. In these conditions, nickel catalysts also break down ammonia. However, in operation, a nickel catalyst is also sensitive to impurities in the gas, and thus its operating efficiency decreases.

Catalytic purification of gasification gas has not yet progressed to commercial applications; the purification reactors are as yet only at the experimental stage. The high reaction temperature required in tests carried out with nickel and dolomite catalysts has been achieved with partial combustion of the gasification gas [4]. The catalyst has been located in the fluidized layer in the solid bed in the reactor, and the gas has been heated in a combustion chamber or zone preceding it so that the transfer of heat from the gas to the fluidized layer has produced the reaction temperature required by the catalysis.

It is also known per se to use catalytic combustion for the heating of the reactor and the catalyst bed. One example of this technology is the steam reformation process of hydrocarbons, wherein the reformer has been caused to operate autothermally by means of an alternation of catalytic combustion and reformation steps in the same catalyst bed [5].

SUMMARY OF THE INVENTION

The object of the present invention is to provide a novel option for the purification of gasification gas, by means of which especially ammonia and tarry impurities can be broken down catalytically in one step at a temperature lower than the operating temperature of known nickel and dolomite catalysts. The invention, by means of which the said objective can be attained, is in particular characterized in that a catalyst containing at least one zirconium compound is used for the purification of gasification gas.

BRIEF DESCRIPTION OF THE DRAWING

These and other feature of this invention will now be described with reference to the drawings of preferred embodiments which are intended to illustrate and not to limit the invention.

DETAILED DESCRIPTION OF THE PREFERRED EMBODIMENT

Figure 1:
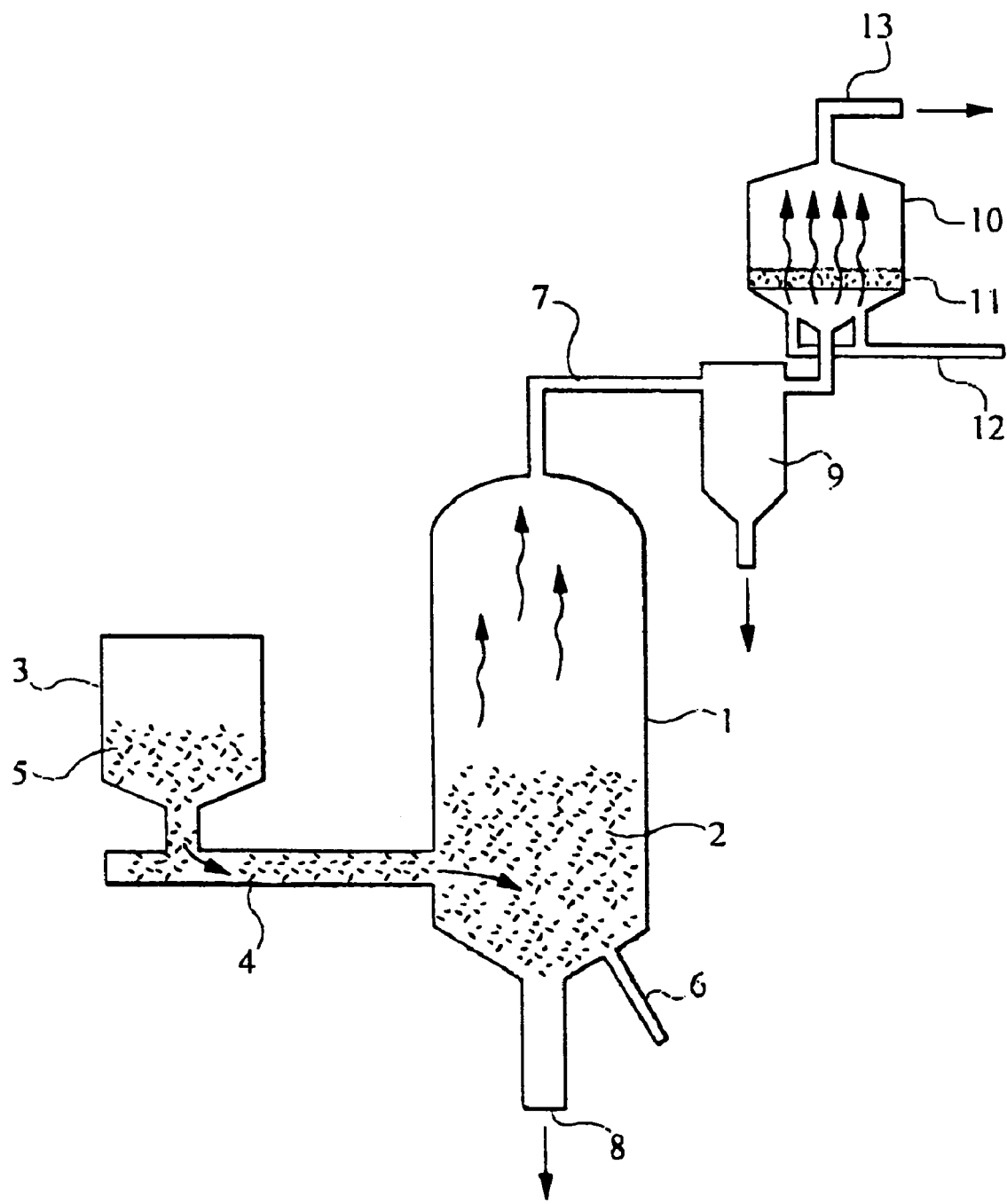
FIG. 1 shows an apparatus according to the invention.

In preliminary tests concerning the invention it has been observed that with zirconium catalysts it is possible to attain a 60-80% tar and ammonia conversion at a temperature of approx. 600° C., i.e. considerably below the temperature required by nickel and dolomite catalysts, with a gas space velocity of 2000 times an hour. The purification result is clearly better than with an aluminum oxide catalyst working at the same reaction temperature.

The use of zirconium compounds as ingredients of catalyst materials is not novel per se; according to the literature, zirconium oxide ($ZrO_2$) has been used as the catalyst support material in reformation processes and as the electrolyte material in fuel cells [6,7,8]. However, it is not known to the applicant that zirconium compounds would have been used as an active ingredient in catalysts or even as a carrier combined with some other catalyst in the purification of gasification gas with the purpose of causing ammonia and organic tarry impurities to break down before the use of the gas for energy production or in some other manner.

A preferred zirconium compound used as a catalyst according to the invention is zirconium oxide ($ZrO_2$), with which good results have been obtained in preliminary tests. Zirconium can be incorporated into a catalyst also as zirconium hydroxide (ZrOH), which converts to zirconium oxide at the reaction temperatures used.

According to the invention, the zirconium compound can be used as a catalyst either per se or combined with some other compound having catalytic action, such as aluminum oxide ($Al_2O_3$). In such combinations the proportion of zirconium compound is preferably over 50%. Furthermore, it is possible to combine a catalytically acting zirconium compound with an inert support, for example, by impregnation or as a coating on the support material.

Technical options for contacting the gasification gas to be purified With the catalyst include directing the gas stream in a fluidized-bed reactor through a fluidized bed containing the catalyst, or directing the gas stream through a solid catalyst bed in a reactor. In the latter case the catalyst may be attached to an inert honeycomb structure of, for example, a ceramic material or metal, serving as the support.

The invention presupposes the adding of oxygen or an oxygen-containing gas to gasification gas in a manner known per se in the purification reactor for gasification gas or immediately before it. The purpose of the adding is partial oxidation of the gasification gas in order to reach and maintain the reaction temperature required by the catalysis. The gas may be pure oxygen, air, or a mixture of oxygen and air, and it is fed into the gasification gas stream preferably at a point immediately preceding the purification reactor, from several different feeding points. By means of the addition, the concentration of oxygen in the gas stream is brought to the range 1-5 percent by volume, preferably 2-4 percent by volume. The purpose of these procedures is to minimize premature oxidation of the gasification gas before the catalysis so that the reaction heat is produced only in flameless oxidation of the gas on the catalyst surface, wherein the tar and ammonia are broken down simultaneously. Thus there are avoided the problems associated with partial combustion of the gas at a point preceding the purification reactor, such as readily produced high temperatures above 1000° C., which cause sintering of the ash and coking of the hydrocarbons, and deactivate the catalyst as adhesive solids clog the pores of the catalyst or the conduits in the honeycomb catalyst.

The temperature, before the purification reactor, of the gasification gas to which oxygen is added is at maximum approx. 800° C. and preferably 400-600° C. If the temperature increase produced by partial oxidation is taken into account, the reaction temperature of the catalysis is in this case approx. 500-900° C., and most preferably 500-700° C., which is sufficient for effective action of the zirconium catalyst.

The invention further comprises the use of a catalyst containing a zirconium compound, such as zirconium oxide, for simultaneous removal of ammonia and tarry organic impurities from a gasification gas obtained from a carbonaceous material. The use may take place according to the embodiment options described in detail above.

The invention is illustrated below with reference first to the accompanying drawing depicting an apparatus suitable for the process according to the invention, whereafter the results of tests, relating to the invention, carried out as embodiment examples are presented.

In the apparatus according to the drawing, the gasifier is a fluidized-bed gasifier 1, the fluidized bed 2 in which is made up of particles of lime or some similar inert material. Particulate fuel 5 is fed into the gasifier 1 from a container 3 via pipe 4. Air or other similar gasification gas, which maintains the fluidized bed 2 and the fed fuel particles in a fluidized state and causes a gasification reaction, is fed into the gasifier 1 via conduit 6.

The gasification gas, which is made up mainly of carbon monoxide, carbon dioxide, methane, hydrogen, water vapor and nitrogen, and which additionally contains as impurities ammonia and organic tarry compounds, discharges from the upper end of the gasifier 1 into pipe 7. The ash is removed from the bottom of the gasifier 1 via an outlet 8. Pipe 7 directs the gasification gas to a dust removal cyclone 9, from which the gas further continues to a purification reactor 10, which is equipped with a solid catalyst bed 11. The catalyst bed 11 contains a zirconium compound, such as zirconium oxide, the support of which is an inert honeycomb of a ceramic material. At a point before the catalyst bed 11, air or oxygen is added to the gasification gas to be purified via pipe 12, which in accordance with the drawing branches into two and ends at the conical bottom of the reactor 10. Oxygen causes partial oxidation of the gasification gas in the catalyst bed 11; the heat produced therein maintains the catalytic reaction wherein the ammonia and tarry compounds present in the gas break down. The purified gasification gas discharges from the purification reactor 10 via conduit 13.

The functioning of the process has been ascertained by laboratory tests according to the following examples.

EXAMPLE 1

The functioning of the method was tested using a small-sized fluidized-bed gasification apparatus, wherein the fuel used was crushed forestry residue. The space velocity of the gas was approx. 1.5 $m^3/h$, and it was directed to a reactor containing a zirconium catalyst ($ZrO_2$). Air was mixed with the gas at a point before the catalyst reactor so that the oxygen concentration in the gas was approx. 3%. The temperature in the catalyst reactor in the test was approx. 650° C. The concentration of tar in the gas entering the reactor was 1.3 $g/m^3$ and its $NH_3$ concentration was 2400 ppm. The tar and $NH_3$ concentrations in the gas, measured at a point after the reactor, were 0.2 $g/m^3$ and 480 ppm. The conversions of tar and ammonia were thus 85 and 80%.

EXAMPLE 2

The activities of various zirconium catalysts were compared using a laboratory-scale test apparatus into which it was possible to feed a gasification gas obtained from pure gases by mixing. The gas contained all of the principal components ($CO$, $CO_2$, $CH_4$, $H_2$, $H_2O$, $N_2$) of gasification gas, and additionally ammonia 4000 ppm and toluene as a tar model 15 $g/m^3$. The reactor was a solid-bed reactor in which the catalysts were different types of zirconium catalyst pellets. Oxygen was mixed with the gas at a point before the catalyst reactor so that the oxygen concentration in the gas was approx. 3%. The temperature in the catalyst reactor in the tests was 500-900° C. and the gas flow velocity was 2 l/min. Since other nitrogen compounds (e.g. $NO$, $NO_2$, $N_2O$, $HCN$) may form as byproducts as ammonia breaks down, the concentrations of these compounds, in addition to ammonia, were also measured in the tests performed. In addition to the conversion of ammonia, the total conversions of nitrogen compounds were also calculated. The measured conversions of tar (toluene+benzene formed as a decomposition product), ammonia and nitrogen compounds are shown in Table 1 below.

TABLE 1

| Catalyst | Temperature [° C.] | Conversion of tar [%] | Conversion of ammonia [%] | Conversion of nitrogen compounds [%] |
|---|---|---|---|---|
| 80-90% ZrOH, 10-20% AlOH | 600 | 71 | 69 | 43 |
| $ZrO_2/WO_3$ | 600 | 63 | 56 | 53 |
| $ZrO_2$ | 500 | 53 | 57 | 40 |
| $ZrO_2$, porous type | 600 | 61 | 49 | 48 |
| Sulfidized $ZrO_2/Al_2O_3$ | 650 | 52 | 34 | 32 |
| $ZrO_2$-coated $Al_2O_3$ pellet | 900 | 97 | 41 | 31 |
| 99% $ZrO_2$ | 600 | 62 | 80 | 50 |
| 99% $ZrO_2$ | 900 | 62 | 4 | 2 |

In the oxygen-feeding experiment performed, air was fed at different temperatures into gasification gas, whereafter the gas mixture was allowed to react for approx. 1 second in an empty tubular reactor made from quartz. The oxygen concentration of the gasification gas at the inlet of the reactor was approx. 2% by volume, Table 2.

TABLE 2

Conversion of oxygen mixed with gasification gas when the retention time of the gas at the temperature concerned was approx. 1 second.

| Gas temperature, °C. | Conversion of oxygen, % |
|---|---|
| 700 | 5 |
| 750 | 15 |
| 800 | 30 |
| 850 | 50 |
| 900 | 70 |
| 950 | 80 |

The oxygen-feeding test performed shows that air-feeding according to the invention into gasification gas is still possible at a typical gas outlet temperature of a fluidized-bed gasifier, which is approx. 800° C.

EXAMPLE 4

The heating up of the catalyst with the help of exothermal oxidation reactions was ascertained by measuring the axial temperature profile of the packed solid-bed reactor at the zirconium oxide catalysts when a mixture of gasification gas and oxygen (1-3% by vol. $O_2$) at temperatures of 500-900° C. was fed into the reactor. With the materials tested the catalyst bed heated up strongly when $H_2$, $CH_4$ and CO reacted with oxygen, and the tar model and ammonia broke down simultaneously. With all of the materials tested, the peak temperature in the bed was approx. 100° C. higher than the gas inlet temperature.

The heating up of zirconium catalysts was tested in a laboratory-scale test apparatus into which it was possible to feed a gasification gas mixture. The gas contained all of the principal components of gasification gas, and additionally ammonia 4000 ppm and, as a tar model, toluene 15 g/m³. The reactor was a solid bed reactor with ZrOH as the catalyst. Oxygen was mixed with the gas at a point before the catalyst reactor so that the oxygen concentration of the gas was 2-3%. The temperature in the catalyst reactor was set at the optimum, and the gas flow velocity was 2 l/min. The measured conversions of the tar model and ammonia are shown in Table 3 below.

TABLE 3

| Oxygen concentration in feed, % | Conversion of tar, % | Conversion of ammonia, % |
|---|---|---|
| 2 | 49 | 39 |
| 3 | 69 | 63 |

For an expert in the art it is clear that the applications of the invention are not limited to what is presented above in the form of examples but may vary within the following claims.

REFERENCE PUBLICATIONS

1. FI patent 98926.
2. Leppälahti, J. Behaviour of fuel-bound nitrogen in gasification and in high-temperature $NH_3$ removal processes. VTT publications 369. Espoo 1998.
3. Simell, P. Catalytic hot gas cleaning of gasification gas. VTT publications 330. Espoo 1997.
4. Ekström, C., Espenäs, B. G., Kowalic, E., Resnsfelt, E. and Waldheim, L. EP 0 310 584 (1989).
5. Lyon, R. K. and Cole, J. A. Unimixed Combustion: An Alternative to Fire. Combustion and Flame, Vol. 121, 2000, p. 249-261.
6. Clark, W. D., Folsom, B. A., Seeker, W. R. and Courtney, C. W. Bench Scale Testing of Low-NOx LBG Combustors. ASME Publication 81-GT-59, 1981.
7. Sutton, D., Ross, J. R. H. Catalysts for biomass reforming. Spec. Publ.-R. Soc. Chem. (1998), 216.
8. Holick, H., Kleinschmager, H., Krapf, R., Minor, A. and Rohr, F. J. Development of a Prototype of a High-Temperature Fuel Cell Battery. BMFT-FBT-77-17, 1976, 273 p.

What is claimed is:

1. A method for the purification of gasification gas, comprising the steps of:
    gasifying a carbonaceous material to obtain a stream of gasification gas comprising carbon monoxide, carbon dioxide, methane, hydrogen, water vaper and nitrogen, and additionally comprising as impurities ammonia and organic tarry components;
    adding pure oxygen, air, or a mixture of oxygen and air to said gas stream; and
    contacting the gas stream thus obtained with a solid catalyst comprising at least one zirconium compound, wherein the zirconium compounds is more than 50% of the catalyst, the catalyst being at a reaction temperature of 500 to 900° C., thereby removing ammonia and said organic tarry components from the gasification gas, to yield a purified combustible gasification gas.

2. A method according to claim 1, wherein the zirconium compound is zirconium oxide ($ZrO_2$) or zirconium hydroxide (ZrOH).

3. A method according to claim 2, characterized in that the catalyst contains a mixture of zirconium oxide and some other metal oxide.

4. A method according to claim 1, characterized in that the catalyst comprises an inert support onto the surface of which the active zirconium compound has been introduced.

5. A method according to claim 1, characterized in that the gasification gas is purified by directing it through a solid catalyst bed.

6. A method according to claim 5, characterized in that the catalyst bed comprises a honeycomb structure through which the gasification gas is directed.

7. A method according to claim 1, characterized in that the gasification gas is purified by directing it through a fluidized bed made up of catalyst particles.

8. A method according to claim 1, characterized in that said pure oxygen, air, or a mixture of oxygen and air is added to the gas stream at several feeding points before the solid or fluidized catalyst bed.

9. A method according to claim 1, characterized in that the pure oxygen, air, or a mixture of oxygen and air feeding point or points is/are located in the gas stream at a point immediately before the catalyst bed.

10. A method according to claim 1, characterized in that pure oxygen, air, or a mixture of oxygen and air is added to the gasification gas so that its proportion in the gas stream entering the catalyst bed is 1-5%.

11. A method according to claim 1, characterized in that the oxygen, air, or a mixture of oxygen and air is added to a gasification gas having a temperature of at maximum 800° C.

12. A method according to claim 5, characterized in that the reaction temperature of the catalyst bed is 500-900° C.

13. A method according to claim 5, characterized in that the space velocity of the gas in the catalyst bed is 500-10,000 l/h.

14. A method according to claim 1, characterized in that said oxygen, air, or a mixture of oxygen and air is added to the gasification gas so that its proportion in the gas stream entering the catalyst bed is 2-4%.

15. A method according to claim 7, characterized in that the reaction temperature of the catalyst bed is 500-900° C.

16. A method according to claim 7, characterized in that the space velocity of the gas in the catalyst bed is 500- 10,000 l/h.

17. A method according to claim 1, characterized in that the oxygen, air, or a mixture of oxygen and air is added to a gasification gas having a temperature of 400-600° C.

18. A method according to claim 5, characterized in that the reaction temperature of the catalyst bed is 500-700° C.

19. A method according to claim 7, characterized in that the reaction temperature of the catalyst bed is 500-700° C.

20. A method according to claim 5, characterized in that the space velocity of the gas in the catalyst bed is 1000-2000 l/h.

21. A method according to claim 7, characterized in that the space velocity of the gas in the catalyst bed is 1000-2000 l/h.

22. A method according to claim 3, wherein the other metal oxide is aluminum oxide ($Al_2O_3$).

23. A method according to claim 1 wherein the zirconium compound is an oxygen containing compound.

24. A method according to claim 1, wherein a conversion of ammonia of at least 34% is obtained.

25. A method according to claim 24, wherein the conversion of ammonia is 34 to 80%.

* * * * *

UNITED STATES PATENT AND TRADEMARK OFFICE
CERTIFICATE OF CORRECTION

| | | |
|---|---|---|
| PATENT NO. | : 7,455,705 B2 | Page 1 of 1 |
| APPLICATION NO. | : 10/481357 | |
| DATED | : November 25, 2008 | |
| INVENTOR(S) | : Simell et al. | |

It is certified that error appears in the above-identified patent and that said Letters Patent is hereby corrected as shown below:

At column 1, line 7, after "2001", please insert --.--.

At column 2, line 58, please delete "With" and insert therefore, --with--.

At column 6, line 18, Claim 1, please delete "vaper" and insert therefore, --vapor--.

Signed and Sealed this

Second Day of June, 2009

JOHN DOLL
*Acting Director of the United States Patent and Trademark Office*